United States Patent [19]

Bohler et al.

[11] Patent Number: 4,755,990
[45] Date of Patent: Jul. 5, 1988

[54] COLLISION AVOIDANCE IN A MULTINODE DATA COMMUNICATION NETWORK

[75] Inventors: Walter Bohler, Stowe; Michael E. Forsberg, Underhill; R. Emmett Hughlett, Waterbury; James B. Pitman, Waterbury Ctr., all of Vt.

[73] Assignee: Karl Suss America, Inc., Waterbury Center, Vt.

[21] Appl. No.: 107,498

[22] Filed: Oct. 8, 1987

[51] Int. Cl.$^4$ ............................................. H04J 3/02
[52] U.S. Cl. .................................... 370/85; 340/825.5
[58] Field of Search ............................. 370/85, 95, 88; 340/825.5, 825.51

[56] References Cited

U.S. PATENT DOCUMENTS 4,345,250 8/1982 Jacobsthal ........................ 340/825.5
4,638,311 1/1987 Gerety .................................. 370/85
4,652,873 3/1987 Dolsen et al. ........................ 370/85

Primary Examiner—Douglas W. Olms
Assistant Examiner—Wellington Chin
Attorney, Agent, or Firm—Perman & Green

[57] ABSTRACT

Apparatus and method for collision avoidance in a multinode data communications bus, the bus having a plurality of nodes coupled thereto for transmitting and receiving data over the bus, the bus further including a BUS BUSY signal line bidirectionally connected in common between the nodes, each of the nodes being operable for asserting the BUS BUSY signal line and also for determining the state of the BUS BUSY signal line. In accordance with the invention there is disclosed, for a node having data to transmit on the bus: (a) testing the state of the BUS BUSY line to determine if the line is asserted; (b) asserting, if the line is determined not to be asserted, the BUS BUSY line for a first predetermined interval of time; (c) deasserting the BUS BUSY line for a second predetermined interval of time; (d) testing the state of the BUS BUSY line to determine if the line is asserted; (e) asserting, if the BUS BUSY line is determined to be not asserted, the BUS BUSY line; (f) transmitting the data; and (g) deasserting the BUS BUSY line.

7 Claims, 4 Drawing Sheets

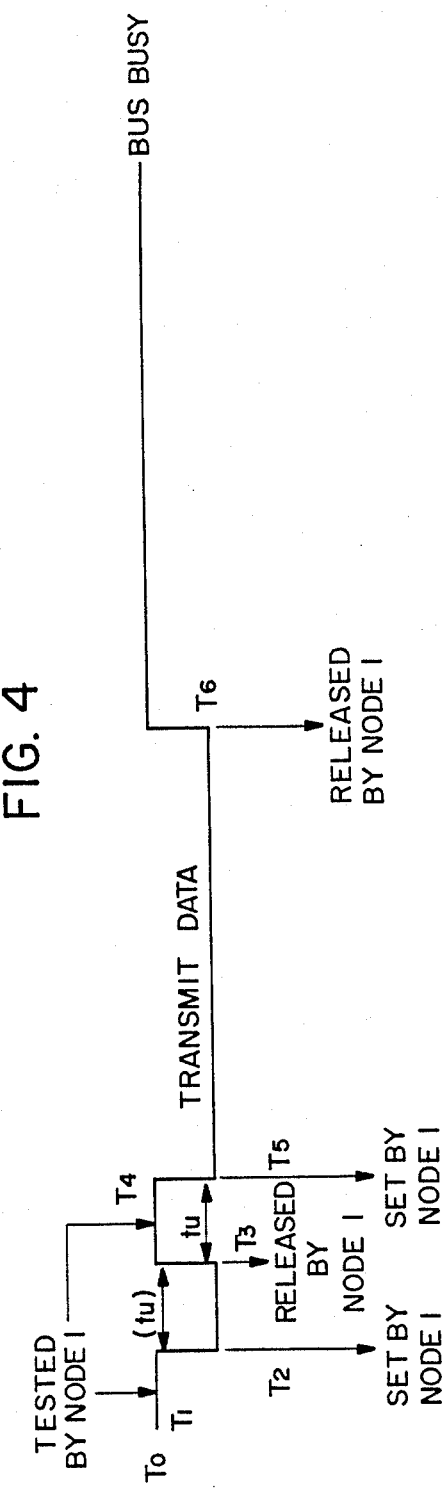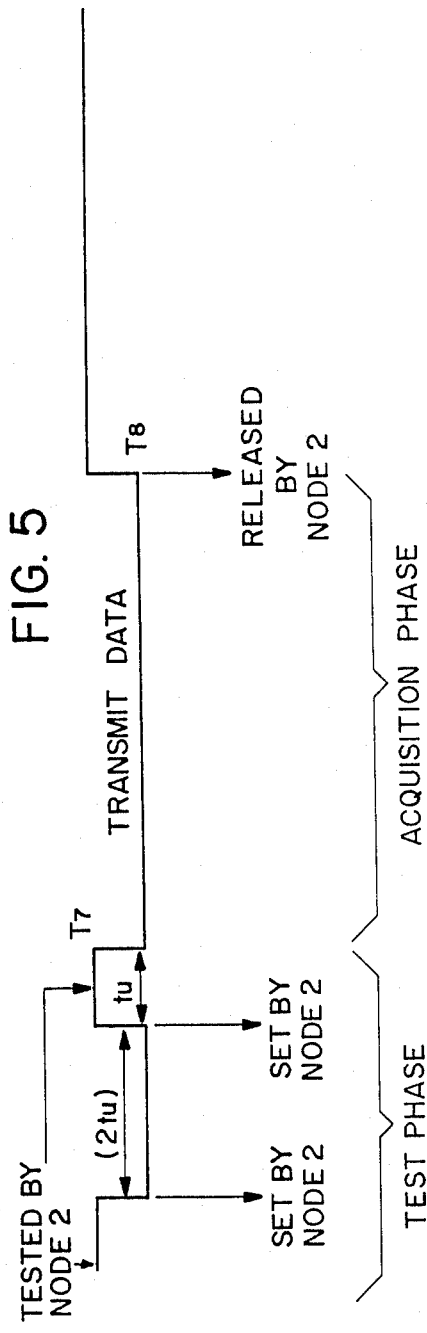

COLLISION AVOIDANCE IN A MULTINODE DATA COMMUNICATION NETWORK

FIELD OF THE INVENTION

The present invention relates generally to data communication networks and, in particular, relates to method and apparatus for insuring collision free data transmission on a multinode date transmission network.

BACKGROUND OF THE INVENTION

A number of various types of data communication networks are utilized for communicatively coupling together data processing systems. Examples of such data communication networks are RS-232, RS-422 and Ethernet. In general, such communication networks are characterized by a synchronous or an asynchronous bit serial transmission of data along a signal line of a communications bus. Each node, such as a data processing system, coupled to the communication bus typically has data transceivers for transmitting data to the bus and for receiving data therefrom.

In addition, a number of different network topologies are available such as a ring topology or a star topology. In some data communication networks, there is a central controlling data element which synchronizes and controls the transmission of data between the various nodes interconnected to the communication bus. Other types of networks employ a distributed type of structure wherein each node operates asynchronously to every other node.

As can be appeciated, in any such data communications network it is essential that two nodes do not attempt to transmit data simultaneously. Such an occurrence is referred to as a collision and results in the destruction of the data and, typically, in the requirement that each of the transmitting nodes once more begin their transmission. It can be further appreciated that a collision tends to reduce the effective bandwidth of the bus.

A variety of different techniques for avoiding collisions or reducing the probability of a collision have been devised. Some of the techniques involve sampling the data bus itself to determine whether or not data is being transmitted at any given time across the bus. It has also been known to provide, in conjunction with the sampling of the data bus, a dedicated signal line for indicating a state of the bus.

In any such collision avoidance technique it is important that the cost and complexity of the technique do not overly burden the system. It is also important that the technique be readily implemented and readily allow for the expansion of the bus such as when additonal nodes are added to the communications bus after the initial installation of the bus.

SUMMARY OF THE INVENTION

The foregoing problems are overcome and other advantages are realized by data collision avoidance apparatus and a collision avoidance method of the invention.

In accordance with a method of the invention there is disclosed a method of avoiding a collision within a data communications bus having a plurality of nodes coupled thereto for at least transmitting data over the bus, the bus further including a BUS BUSY signal line being bidirectionally connected in common between the nodes, each of the nodes being operable for asserting the BUS BUSY signal line and also for determining the state of the BUS BUSY signal line, the method comprising the steps of, for a node having data to transmit on the bus: (a) testing the state of the BUS BUSY line to determine if the line is asserted; (b) asserting, if the line is determined not to be asserted, the BUS BUSY line for a first predetermined interval of time; (c) deasserting the BUS BUSY line for a second predetermined interval of time; (d) testing the state of the BUS BUSY line to determine if the line is asserted; (e) asserting, if the BUS BUSY line is determined to be not asserted, the BUS BUSY line; (f) transmitting the data; and (g) deasserting the BUS BUSY line.

In accordance with apparatus of the invention there is disclosed apparatus for avoiding a collision within a data communications bus having a plurality of nodes coupled thereto for transmitting and receiving data over the bus, the bus further including a BUS BUSY signal line being bidirectionally connected in common between the nodes, each of the nodes being operable for asserting the BUS BUSY signal line and also for determining the state of the BUS BUSY signal line, for each of said nodes the apparatus comprising: first means for testing said BUS BUSY line for determining if the line is asserted; first means for asserting, if said BUS BUSY line is determined to be not asserted, said BUS BUSY line for a first predetermined interval of time; means for deasserting the BUS BUSY line for a second predetermined interval of time; second means for testing said BUS BUSY line for determining if the line is asserted; second means for asserting, if said BUS BUSY line is determined to be not asserted, said BUS BUSY line; means for transmitting the data; and means for deasserting said BUS BUSY line.

BRIEF DESCRIPTION OF THE DRAWINGS

These and other aspects of the invention will be made more apparent in the Detailed Description of the Invention taken in conjunction with the accompanying drawing wherein:

FIGS. 4 and 5 are each a timing diagram illustrating the operation of the method and apparatus of the invention;

DETAILED DESCRIPTION OF THE INVENTION

Figure 1:
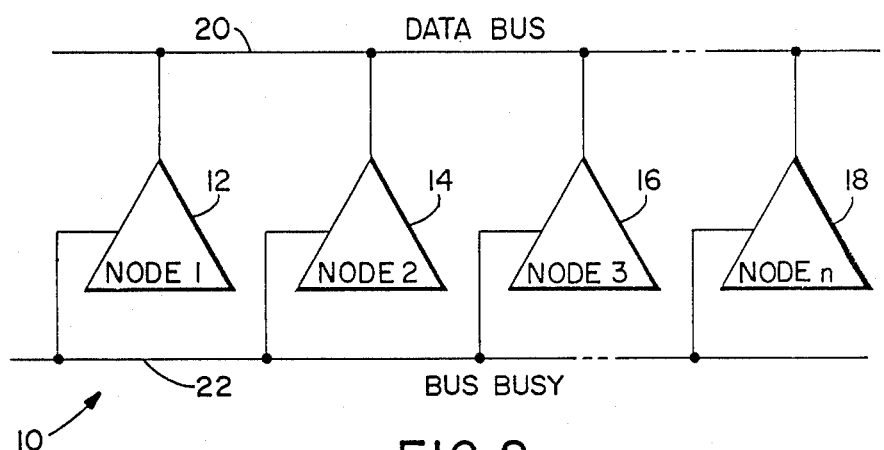
FIG. 1 is a simplified schematic diagram showing a plurality of nodes (12, 14, 16 and 18) coupled to a communication bus 20.

Referring to FIG. 1 there is shown a data communication system 10 comprised of a plurality of data communication nodes 12 through 18. The system 10 may be comprised of an arbitrary number of such nodes such as from two to n number of nodes. Each of the nodes 12-18 has at least an output coupled to a data bus 20, the data bus comprising at least a transmit signal line whereby the nodes transmit data along the bus 20. Each of the nodes may further comprise an input which is coupled to a receive data line within the data bus 20 for receiving data therefrom. Also, and in accordance with the invention, each of the nodes is coupled to a bidirectional BUS BUSY signal line 22, the logical state of which is indicative of whether or not the data bus is currently being utilized for the transmission of data by one of the nodes 12-18.

Figure 2:
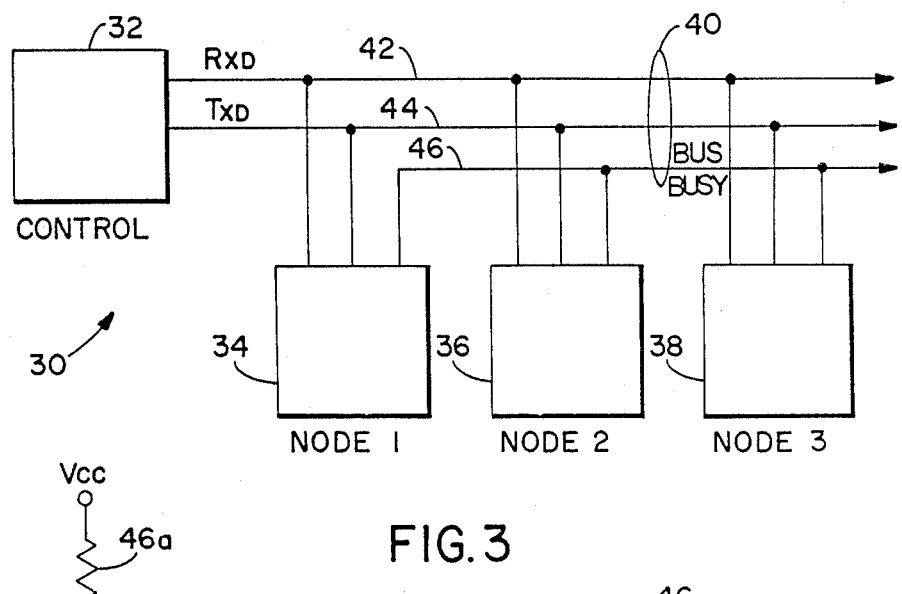
FIG. 2 is a simplified block diagram showing in more detail a plurality of nodes (34, 36 and 38) coupled to a communications bus 40 and a controlling unit 32.

Referring now to FIG. 2 there is shown another data communication system 30 comprised of a control unit 32 which may be a computer system such as a personal computer. Coupled to control 32 are a plurality of nodes 34, 36 and 38. Each of the nodes 34-38 may also be a data processing system or each of the nodes 34-38 may be a specialized circuit, such as a data acquisition circuit. Each of the nodes 34-38 is coupled to control 32 by a communications bus 40 which can further be seen to be comprised of a receive data line (Rxd 42), a transmit data signal line (Txd 44) and a BUS BUSY signal line 46. As can be seen, the Rxd42 signal line is coupled to the Txd output of each of the nodes 34-38. Also, the Txd 44 signal line of bus 40 is coupled to the Rxd signal inputs of each of the nodes 34-38. Thus, each of the nodes is enabled to transmit data from its Txd output, the data being received on the Rxd input of control 32. Similarly, data transmitted from control 32 on the Txd signal line 44 may be received by one or more of the nodes 34-38 on its respective Rxd signal line input. Of course, bus 40 may also comprise other signal lines (not shown) for controlling the flow of data therethrough. For example, if bus 40 is an RS-232 type bus there may be a Data Terminal Ready, Request to Send, a common or ground line and other such signal lines. The actual type of data communications bus utilized is not germane to an understanding of the operation of the invention and, hence, will not be described in detail herein.

Furthermore, and in accordance with the method and apparatus of the invention, each of the nodes 34-38 is coupled in common to a BUS BUSY signal line 46. Each of the nodes 34-38 is operable for both driving the BUS BUSY line 46 and for determining the state of the BUS BUSY line 46. For example, the BUS BUSY line may be defined to be in a deasserted, or not busy state, when the BUS BUSY line 46 is at a logic high level. Conversely, the BUS BUSY line 46 may be defined to be asserted, or busy, when at a logic low logic state. BUS BUSY is a bidirectional signal line, that is it is operable for propagating a signal simultaneously in two directions from a node asserting the line.

Figure 3:
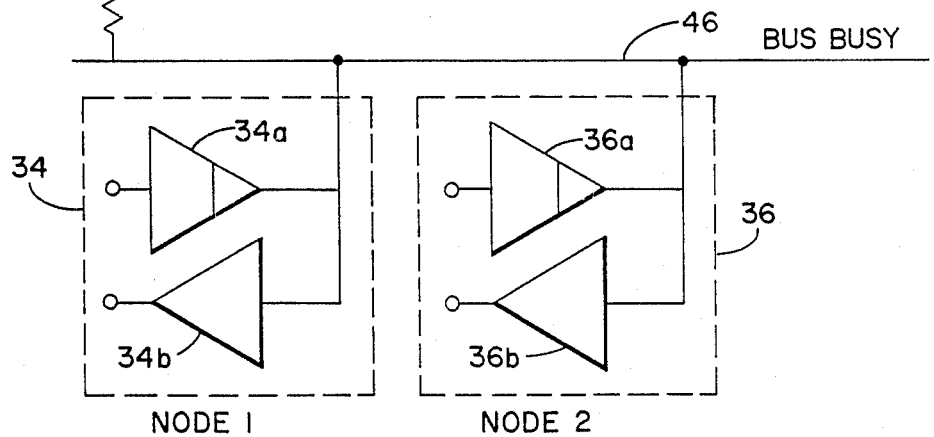
FIG. 3 shows a simplified schematic diagram of BUS BUSY line drivers and receivers.

In FIG. 3 there are shown representative drivers and receivers for so driving and determining the state of the BUS BUSY line 46. For example, each of the nodes, such as node 34 and node 36, may each be provided with an open collector type line driver 34a and 36a, respectively, having an input coupled to an asserting means within the node. Furthermore, each of the nodes 34 and 36 may be provided with a line receiver 34b and 36b, respectively, having an input coupled to the BUS BUSY 46 and an output coupled to a suitable reading means within the respective node. If the line drivers 34a and 36a are open collector or open drain type drivers the BUS BUSY line may also be provided with a pullup resistor 46a.

Thus, it can be seen in reference to FIG. 2 and FIG. 3 that each of the nodes is provided with a means for driving the BUS BUSY line to an asserted or a deasserted logic state and also for reading the state of the BUS BUSY line 46. It should be noted that due to the high impedance, open collector or open drain type of driver provided within each of the nodes that if any one of the nodes asserts the BUS BUSY line, that is, drives the BUS BUSY line to a logic low state, that each of the other nodes will be able to detect this asserted conditon.

Referring now to the timing diagrams of FIGS. 4 and 5 in conjunction with the flow chart of FIG. 6 there will be described a method, in accordance with the invention, of collision avoidance during the transmission of a data packet. A data packet may be one byte of data or some arbitrarily large number of bytes.

Figure 6:
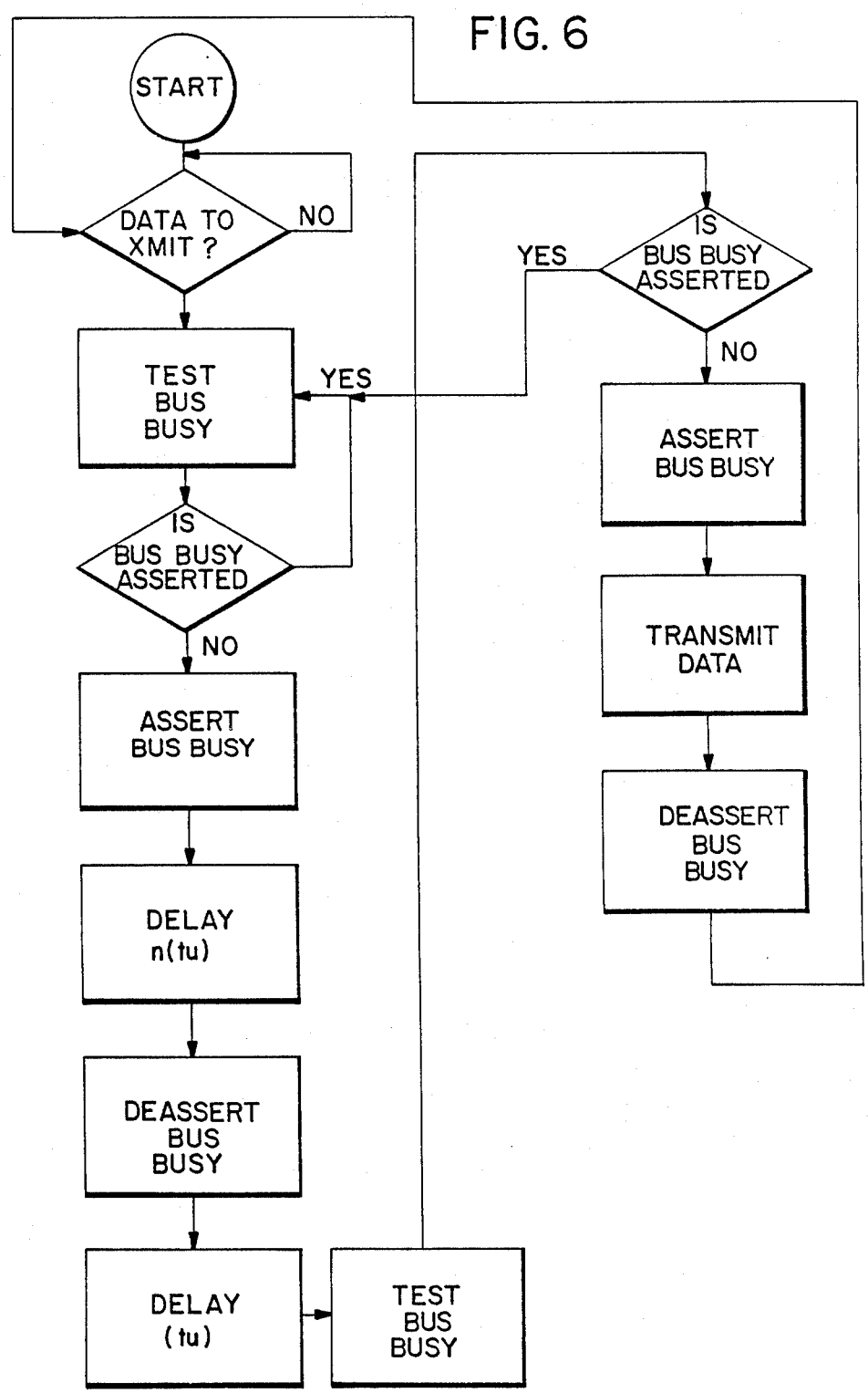
FIG. 6 is a flow chart which illustrates the operation of the method and apparatus of the invention.

Referring first to FIG. 4 in conjunction with FIG. 6 there is shown at time $T_O$ that the BUS BUSY line is deasserted, or not busy. If, at time $T_O$, node 1 determines that it has a packet of data to transmit along the communications bus node 1 initiates a test phase by testing the state of the BUS BUSY line by reading the output of its respective bus receiver 34b. If the BUS BUSY line is determined to be deasserted at $T_1$ node 1 thereafter asserts the BUS BUSY line by causing line driver 34a to place a logic low state on the BUS BUSY line 46. This occurs at time $T_2$. Thereafter, node 1 delays a predetermined unit of time $n(t_u)$. The actual duration of $n(t_u)$ is related to the amount of time required by node 1 to test the BUS BUSY line at $T_1$ and to thereafter assert the BUS BUSY line at $T_2$. After delaying for $n(t_u)$ the BUS BUSY line is deasserted, or released, by node 1 at time $T_3$. Thereafter, the node 1 will delay an interval of time related once again to $t_u$ before retesting the BUS BUSY line 46. If the BUS BUSY line 46 is determined to once more be deasserted, at time $T_4$, node 1 is assured that the data communications bus is unused. Node 1 terminates the test phase by once more asserting BUS BUSY at time $T_5$ thereafter transmitting one or more data packets. At time $T_6$ the transmission of the data is completed and node 1 deasserts the BUS BUSY line 46.

As can be appreciated, if each of the nodes coupled to the communications bus utilizing the above described protocol has the same value of $n(t_u)$ for testing the state of the bus there would be the possibility that two nodes would simultaneously test, determine that the bus was not busy, assert the BUS BUSY line for essentially the same interval of time, deassert and then retest the bus and determine once again that the bus was not busy. If both such nodes thereafter transmitted data a collision would occur.

Such a collision is avoided by, in accordance with the invention, providing each of the nodes coupled to the bus with a different characteristic unit of time for asserting the BUS BUSY line during the test phase. As can be seen in FIG. 5, taken in conjunction with FIG. 4, if both nodes 1 and 2 test the BUS BUSY line at $T_1$ and thereafter both assert the BUS BUSY line at $T_2$ that the node 1 will deassert its BUS BUSY and retest the BUS BUSY line at $T_4$. If node 2 has a $n(t_u)$ which, for example, is at least twice that of node 1, node 1 will determine at $T_4$ that the BUS BUSY line is asserted or busy. This determination by node 1 prevents node 1 from thereafter asserting BUS BUSY and transmitting its data packet. Thus, node 2 after delaying $2(t_u)$ deasserts BUS BUSY and retests the state of the BUS BUSY line at $T_7$. Inasmuch as node 1 at this time is not transmitting data and is therefore not driving the BUS BUSY line node 2 is enabled to assert the BUS BUSY line and transmit its packet of data. At time $T_8$ node 2 completes its transmission and deasserts the BUS BUSY line.

It can be seen that by providing each of the nodes coupled to the communication bus with a test phase unit time $n(t_u)$ which is a multiple of some predetermined value $t_u$, wherein the duration of $t_u$ is slightly longer than the time required between the testing of the BUS BUSY line by a node and the subsequent assertion of the line if the BUS BUSY is determined to be not asserted, that a collision avoidance is assured. In general, it has been found that if for each node that the node asserts BUS BUSY during the test phase for a time $n(t_u)$, where n is an integer value which has a unique value for each node, that data collisions are avoided. For example, node 1 may have a test phase unit time of $1(t_u)$, node 2 a value of $2(t_u)$ and node n a value of $n(t_u)$.

It can be appreciated that the method of the invention may be realized by a number of different type of means. For example, each of the nodes may comprise a data communications means and a microprocessor device which is operable for driving and reading its respective BUS BUSY line driver and line receiver. The flow chart of FIG. 6 may be readily realized by microprocessor instructions to execute the algorithm embodied therein. If desired, dedicated circuitry may additionally be provided for realizing all or a portion of the algorithm embodied in the flow chart of FIG. 6.

Figure 7:
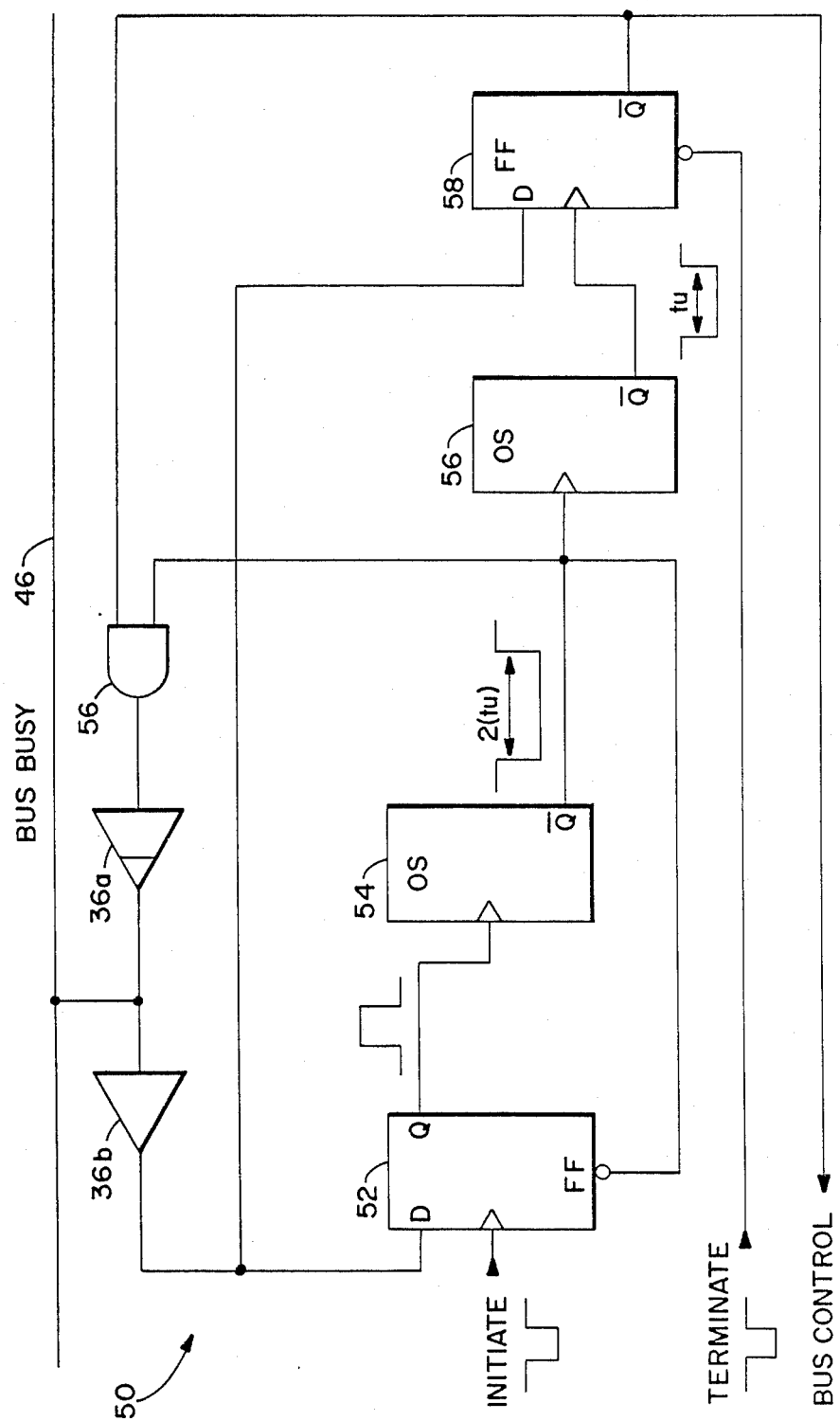
FIG. 7 is a simplified schematic diagram showing, by example, circuitry operable for implementing the flow chart of FIG. 6.

By way of example, there is shown in FIG. 7 a circuit 50 which is operable for executing the algorithm expressed in the flow chart of FIG. 6. An initiate pulse, which may be provided by a microprocessor within a particular node, such as the node 2 of FIGS. 1 and 2, is provided to initiate the collision avoidance algorithm. The rising edge of the initiate pulse is provided to the clock input of a D-flip flop (FF) 52. A D input of FF 52 is coupled to the output of the BUS BUSY signal line 46 receiver 36b. If, when the rising edge of the initiate pulse is present at the clock input of FF 52 the BUS BUSY signal line 46 is deasserted, the D input will be high which will cause FF 52 to set. The setting of FF 52 results in a rising edge at a clock input to a one shot (OS) 54. OS 54 has a Q-not output which has a logic low pulse width of, for example, 2 $(t_u)$. This pulse output of OS 54 is provided to an AND gate 56 which has an output coupled to the input of BUS BUSY signal line driver 36a. Thus, the BUS BUSY signal line 46 will be asserted for an interval of time equal to 2 $(t_u)$. The output of OS 54 is also provided to a reset input of FF 52 to reset FF 52. The output of OS 54 is also provided to the clock input of a second one shot (OS 56). OS 56 has a pulse output having a pulse width equal to the characteristic unit time, or $t_u$. Thus, when the output of OS 54 returns high the BUS BUSY signal line 56 is deasserted and the operation of OS 56 is initiated for $t_u$. When the pulse output of OS 56 returns high it clocks a second FF 58 which also has a D input coupled to the output of receiver 36b. Thus, if the BUS BUSY signal is deasserted at this time the Q-not output of FF 58 will go low, this output being also coupled to AND gate 56 for asserting the BUS BUSY signal 46. The BUS BUSY signal 46 will remain asserted until a terminate pulse is provided to the reset input of FF 58, possibly by the processing device which also provided the initiate pulse to FF 52.

If desired, the output of FF 58 may also be provided as an input to the processing device, such as being coupled to an interrupt input, whereby the processing device may be apprised of whether or not control has been achieved of the data communications bus.

The operation of circuit 50 has been described for the case wherein there has been no contention for the data communications bus. It can be realized that if the BUS BUSY signal were already asserted when the initiate pulse was first applied to FF 52 that FF 52 would not have set thereby not having initiated the operation of OS 54. Furthermore, it can be seen that if the BUS BUSY line 46 were asserted at the time of the rising edge of OS 56, that being $t_u$ after the assertion of the BUS BUSY line after the test phase, that the Q-not output of FF 58 would not have been asserted to thereby assert BUS BUSY 46 and also, would not have indicated to the processor that bus control had been achieved.

Each node may be assigned its characteristic $t_u$ multiplier value in a variety of ways. A simple switch or switches, readable by a microprocessor device, will suffice. For the embodiment of FIG. 7 OS 54 may have resistive and capacitive elements which determine the output pulse width. A switch may be provided for selecting a particular timing component value which yields a desired integer multiple of $t_u$.

In general, the use of dedicated circuitry such as in FIG. 7 results in a $t_u$ which is of smaller duration than a $t_u$ associated with a microprocessor device embodiment of the invention. This is because the delay between testing BUS BUSY and the subsequent assertion of BUS BUSY will generally be in the submicrosecond range related to the gate delays of the logic devices. If the invention is realized by microprocessor programming instructions the characteristic delay $t_u$ may be measured in microseconds or even tens of microseconds. The choice of embodiments for a particular application is thus related to timing constraints, system cost and other such factors.

It can be appreciated that the circuitry shown in FIG. 7 is illustrative only and that a great variety of circuit means operable for realizing the algorithm of the flow chart of FIG. 6 may occur to those having skill in this art. Similarly, other variations and modifications to the method and apparatus disclosed herein may also occur. Thus, the present invention is not meant to be limited to the embodiments disclosed herein, the invention is instead meant to be limited only as defined by the appended claims.

What is claimed is:

1. A method of avoiding a collision within a data communications bus having a plurality of nodes coupled thereto for at least transmitting data over the bus, the bus further including a signal line bidirectionally connected in common between the nodes, each of the nodes being operable for asserting the signal line and also for determining the state of the signal line, the method comprising the steps of:

for a node having data to transmit on the bus;
  (a) testing the state of the signal line to determine if the line is asserted;
  (b) asserting, if the line is determined not to be asserted, the signal line for a first predetermined interval of time;
  (c) deasserting the signal line for a second predetermined interval of time;
  (d) testing the state of the signal line to determine if the line is asserted;
  (e) asserting, if the signal line is determined to be not asserted, the signal line;
  (f) transmitting the data; and
  (g) deasserting the signal line.

2. The method of claim 1 wherein the second predetermined interval of time is related to the time required for the node to execute step (a) and step (b).

3. The method of claim 2 wherein the first predetermined interval of time is related to the second interval of time multiplied by a value unique to the node.

4. Apparatus for avoiding a collision within a data communications bus having a plurality of nodes coupled thereto, each of said nodes being operable for at least transmitting data over the bus, for each of said nodes the apparatus comprising:

a signal line bidirectionally connected in common between the nodes, the state of the signal line being indicative of the utilization of the communications bus;

first means for testing said signal line for determining if the line is asserted;

first means for asserting, if said signal line is determined to be not asserted, said signal line for a first predetermined interval of time;

means for deasserting the signal line for a second predetermined interval of time;

second means for testing said signal line for determining if the line is asserted;

second means for asserting, if said signal line is determined to be not asserted, said signal line;

means for transmitting the data; and means for deasserting said signal line.

5. The apparatus of claim 4 wherein the second predetermined interval of time is substantially equal to a time required to test the signal line and, if the line is determined not to be asserted, assert the signal line.

6. The apparatus of claim 5 wherein the first predetermined interval of time is substantially equal to the second interval of time multiplied by a value unique to said node.

7. The apparatus of claim 6 wherein the value is an integer value.

* * * * *